(12) United States Patent
Hoffmann et al.

(10) Patent No.: US 6,333,585 B1
(45) Date of Patent: Dec. 25, 2001

(54) DISCHARGE CIRCUIT FOR A CAPACITIVE ACTUATOR

(75) Inventors: Christian Hoffmann, Regensburg; Hellmut Freudenberg, Grossberg; Hartmut Gerken, Nittendorf; Martin Hecker, Laimerstadt; Richard Pirkl, Regensburg, all of (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/555,019

(22) PCT Filed: Sep. 14, 1999

(86) PCT No.: PCT/DE99/02912

§ 371 Date: Aug. 15, 2000

§ 102(e) Date: Aug. 15, 2000

(87) PCT Pub. No.: WO00/17943

PCT Pub. Date: Mar. 30, 2000

(30) Foreign Application Priority Data

Sep. 23, 1998 (DE) .............................................. 198 43 621

(51) Int. Cl.$^7$ .................................................. H01L 41/08
(52) U.S. Cl. .......................................................... 310/316.03
(58) Field of Search .......................................... 310/316.03

(56) References Cited

U.S. PATENT DOCUMENTS

| | | | |
|---|---|---|---|
| 4,109,174 | * | 8/1978 | Hodgson .......................... 310/316.03 |
| 4,732,129 | * | 3/1988 | Takigawa et al. ............... 310/316.03 |
| 4,767,959 | * | 8/1988 | Sakikabara et al. ............. 310/316.03 |
| 4,947,074 | * | 8/1990 | Suzuki ............................ 310/316.03 |
| 5,036,263 | * | 7/1991 | Yamada et al. .................. 310/316.03 |
| 5,208,505 | * | 5/1993 | Mitsuyasu ........................ 310/316.03 |
| 5,214,340 | * | 5/1993 | Suzuki ............................ 310/316.03 |
| 5,543,679 | * | 8/1996 | Morino et al. ................... 310/316.03 |
| 6,081,061 | * | 6/2000 | Reineke et al. .................. 310/316.03 |
| 6,204,591 | * | 3/2001 | Nariai ............................. 310/316.03 |

FOREIGN PATENT DOCUMENTS

| | | |
|---|---|---|
| 17 63 686 B2 | 1/1972 | (DE) . |
| 196 52 801 C1 | 4/1998 | (DE) . |
| 197 09 717 C1 | 9/1998 | (DE) . |
| 0 464 443 A1 | 1/1992 | (EP) . |

* cited by examiner

*Primary Examiner*—Mark O. Budd

(57) ABSTRACT

A capacitive actuator (P), especially for a piezoelectrically operated injection valve for an internal combustion engine, is short-circuited by a discharge switch (M) after an actuation, the controlling input of the discharge switch (M) being connected to the actuator (P) so that the discharge switch (M) in case of a failure of the external control, is automatically rendered conductive by the actuator voltage ($U_P$) and the actuator (P) is therefore automatically discharged.

6 Claims, 6 Drawing Sheets

DISCHARGE CIRCUIT FOR A CAPACITIVE ACTUATOR

Figure 1A:
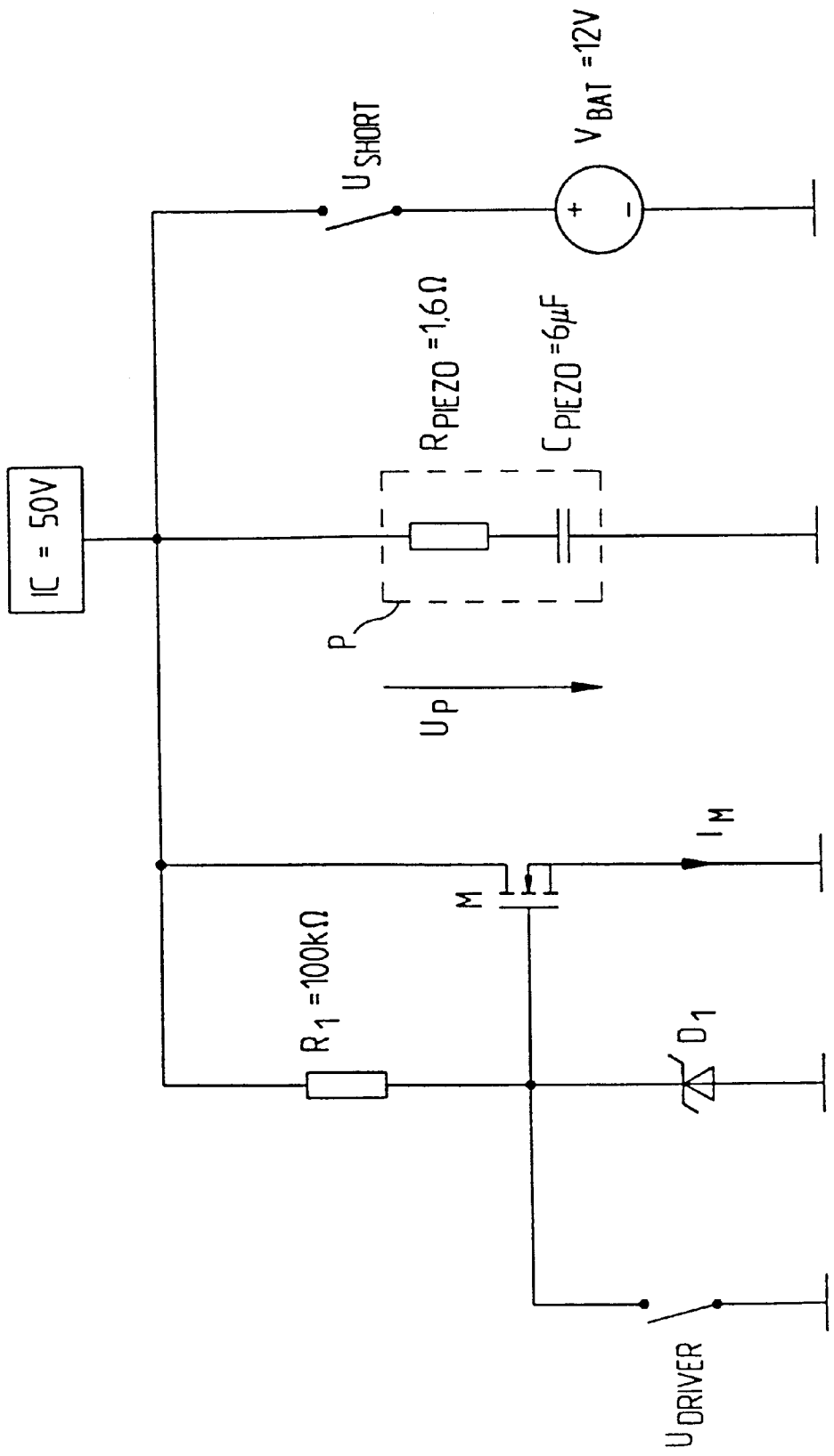

The invention relates to a discharge circuit for a capacitive actuator, especially for a piezoelectrically operated fuel injection valve for an internal combustion engine, according to the preamble of claim 1.

A piezoelectric actuator consists of a plurality of piezoceramic layers which are piled one on the other to form a so-called "stack" which changes its dimensions, especially its length when an electrical voltage is applied, or when mechanical pressure or traction is applied it produces and electric current.

In the use of such a piezoelectric actuator in a fuel injection system an electric voltage is applied to the actuator which is thus electrically charged to inject fuel, while in the uncharged state of the actuator no fuel is injected. It is therefore necessary after an injection to restore the actuators back to the safe state wherein the actuators are uncharged and accordingly no fuel injection takes place. In the previously published German Patent Application 196 52 801.1 a discharge switch is used for this purpose, which is connected parallel to the actuators and short-circuits them to discharge them, so that the electric charge of the actuators is rapidly discharged. It is disadvantageous, however, that the discharge switch for the discharge of the actuators must be actively operated, so that the discharging of the actuators will not take place if the power supply of the control circuit drops out or the control circuit fails to operate.

The invention is thus addressed to the problem of creating a discharge circuit for a capacitive actuator which will permit a reliable discharge of the actuators after an actuation, even if power to the control circuit drops out and even in case of a failure of the control circuit.

The problem is solved, setting out from the above-described, known discharge circuit according to the preamble of claim 1, by the distinctive features of claim 1.

The invention includes the general technical teaching of providing in the discharge circuit not only for a conventionally operated discharge, but also for an automatic discharge which operates automatically whenever the operation of the conventional discharge fails, which can be the case, for example, due to a power failure or to a malfunction.

The discharge circuit according to the invention therefore has preferably a discharge switch and a short-circuit switch, the discharge circuit acting only when the short-circuit switch fails due, for example, to a power failure. In this case the discharge switch is automatically activated by the charge present in the actuator and then discharges the actuator except for a residual charge voltage at which the discharge switch again closes automatically and thus ends the discharging action.

The discharge switches are preferably in the form of MOSFET switches, but other kinds of controlled devices can be used in which the electrical resistance can be influenced by a controlling input.

The controlling input of the discharge switch is preferably connected with the actuator to be discharged, so that the voltage decreasing through the actuator operates the discharge switch. If the charge stored in the actuator is sufficiently great, the discharge switch is automatically made conductive, so that the actuator is short-circuited. The charge stored on the actuator then flows away until the voltage dropping across the actuator is no longer sufficient to make the discharge switch conductive, thereby ending the discharge action.

The controlling input of the discharge switch, however, is preferably operated not by the electrical charge in the actuator alone, but it can also be grounded by the control circuit in order to close the discharge switch independently of the charge of the actuator and thus prevent any automatic discharge of the actuator, which is important in the normal operation of the actuator.

In an advantageous variant of the invention, the controlling input of the discharge switch is connected through a voltage divider to the actuator, so that it is not the full voltage of the actuator that is applied to the controlling input of the discharge switch, but only a fraction of this voltage corresponding to the size of the voltage divider. If the voltage divider consists, for example, of a resistor R1=100 kΩ and a resistor R2=50 kΩ, the control voltage amounts to only ⅓ of the charge voltage of the actuator. Such an arrangement with a voltage divider for operating the discharge switch is especially advantageous if the short-circuit switch shorts the actuator through a battery, since then the battery voltage is applied to the actuator and thus also to the controlling input of the discharge switch. The discharge switch is then conductively operated by the battery voltage applied to its controlling input, so that a large current flows through the discharge switch, which can result in the destruction of the discharge switch. The voltage divider is therefore preferably of such a size that the residual discharge voltage is above the battery voltage, so that the battery voltage does not suffice to make the discharge switch conductive.

In another variant of the invention the controlling input of the discharge switch is connected to the actuator through a Zener diode, so that the discharge begins only when the actuator voltage is greater than the sum of the voltage threshold of the discharge switch and the Zener diode voltage. The residual discharge voltage can in this case, therefore, be established by an appropriate sizing of the Zener diode so that the battery voltage does not suffice to make the discharge switch conductive, thereby prevent destruction of the discharge switch by the battery current.

Other advantageous embodiments of the invention are described in the claims and are explained below with the aid of the figures together with the description of the preferred embodiment of the invention.

Figure 1B:
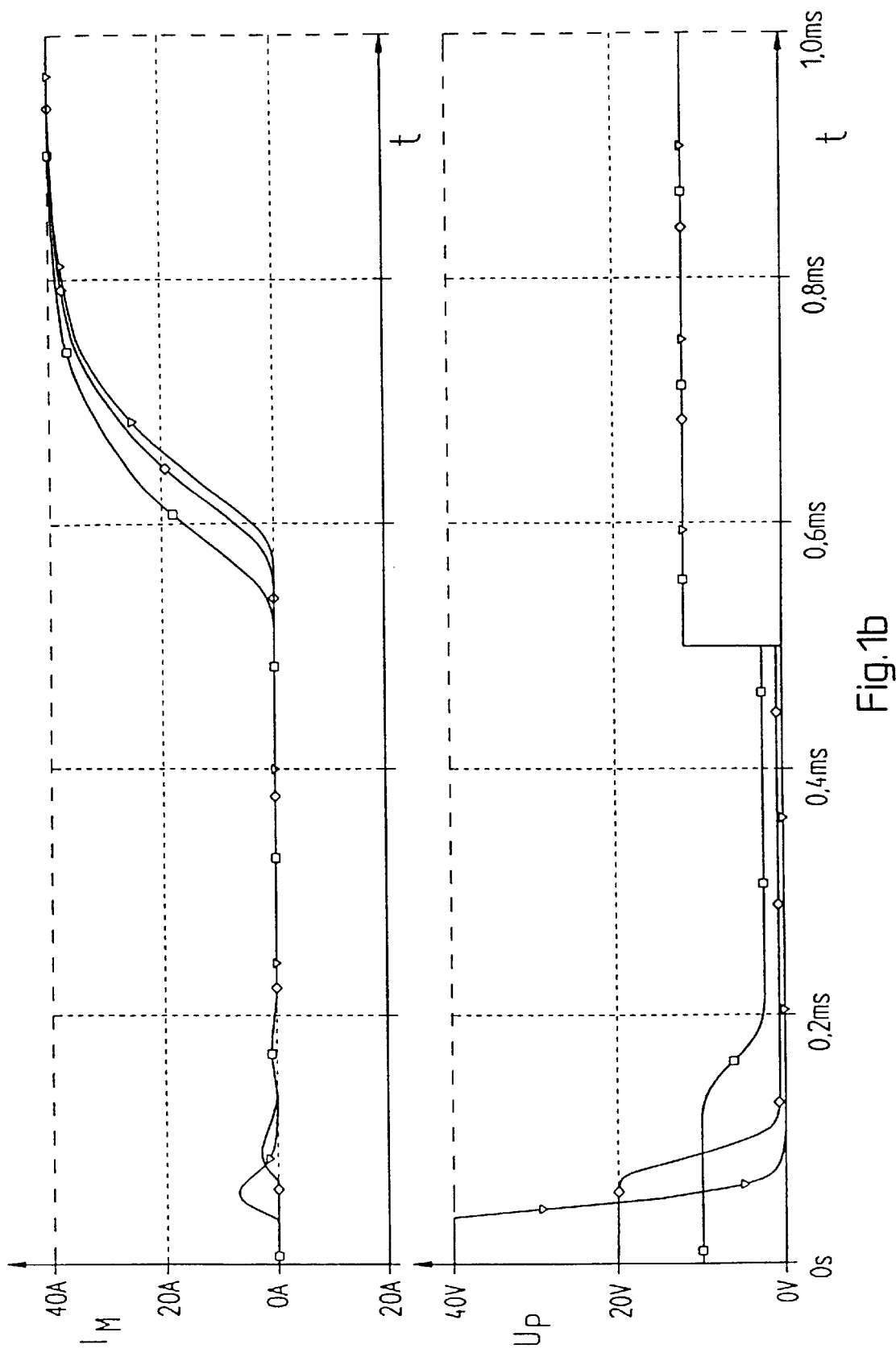
Figure 2A:
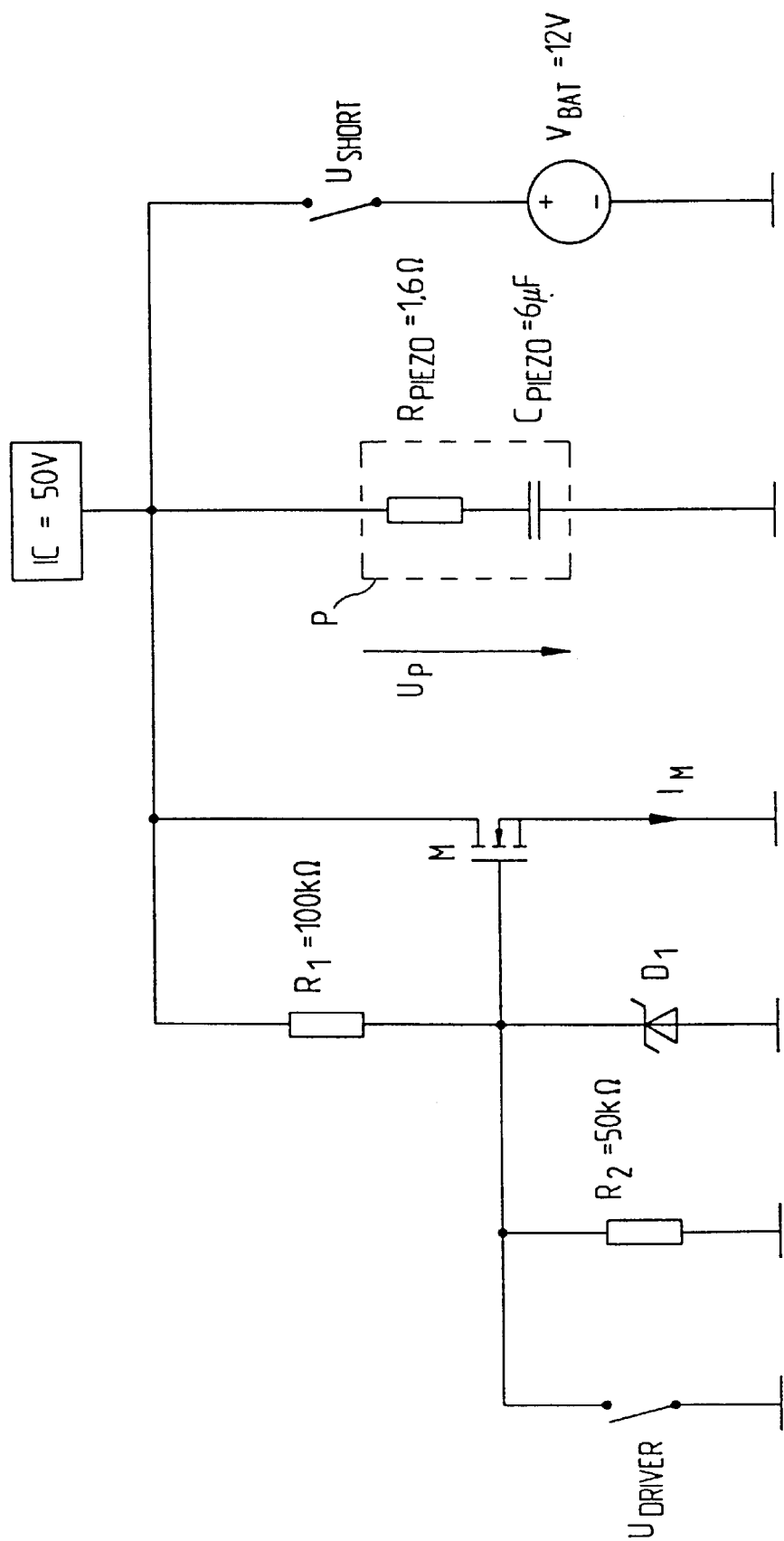
Figure 2B:
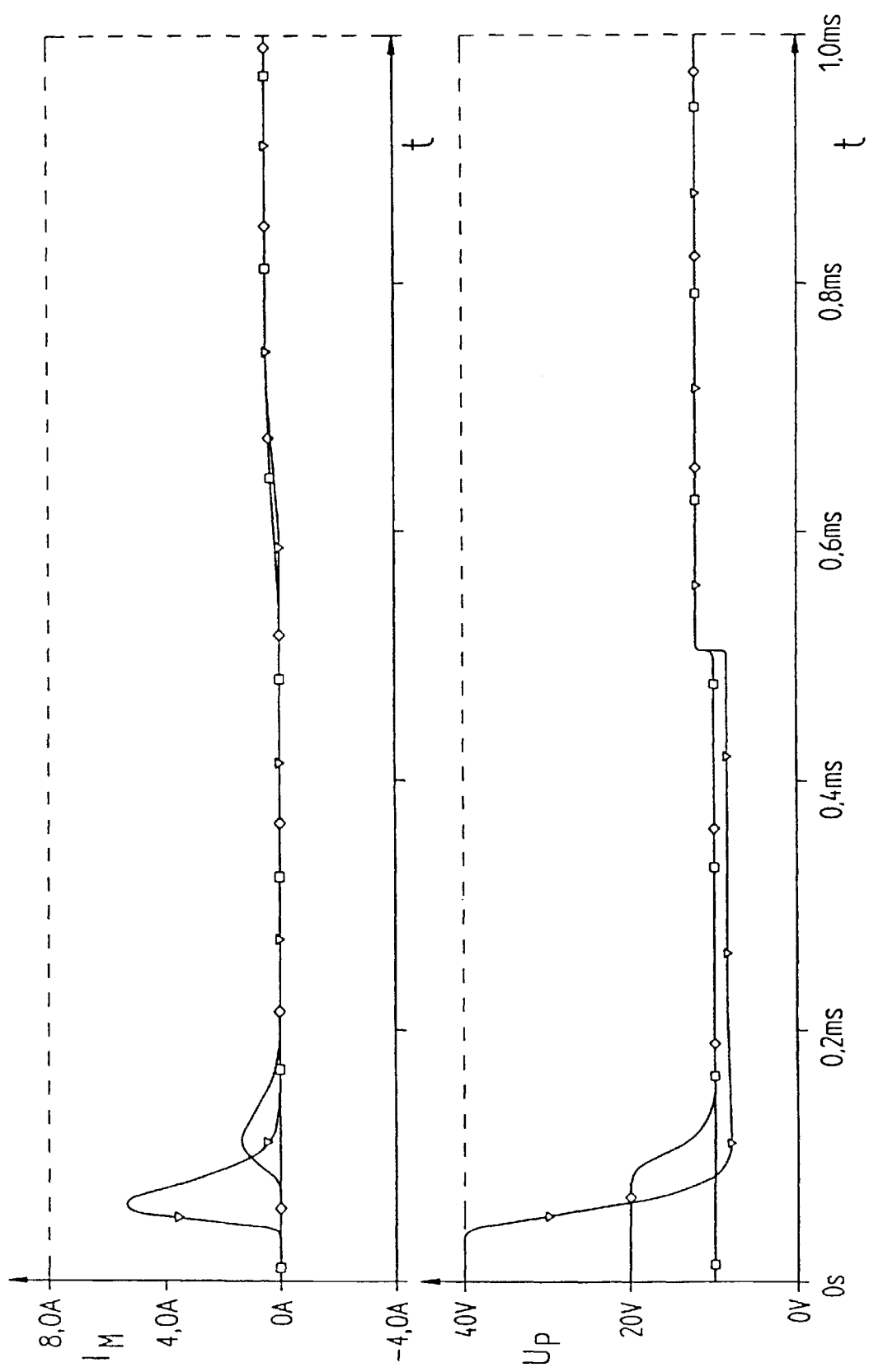
Figure 3A:
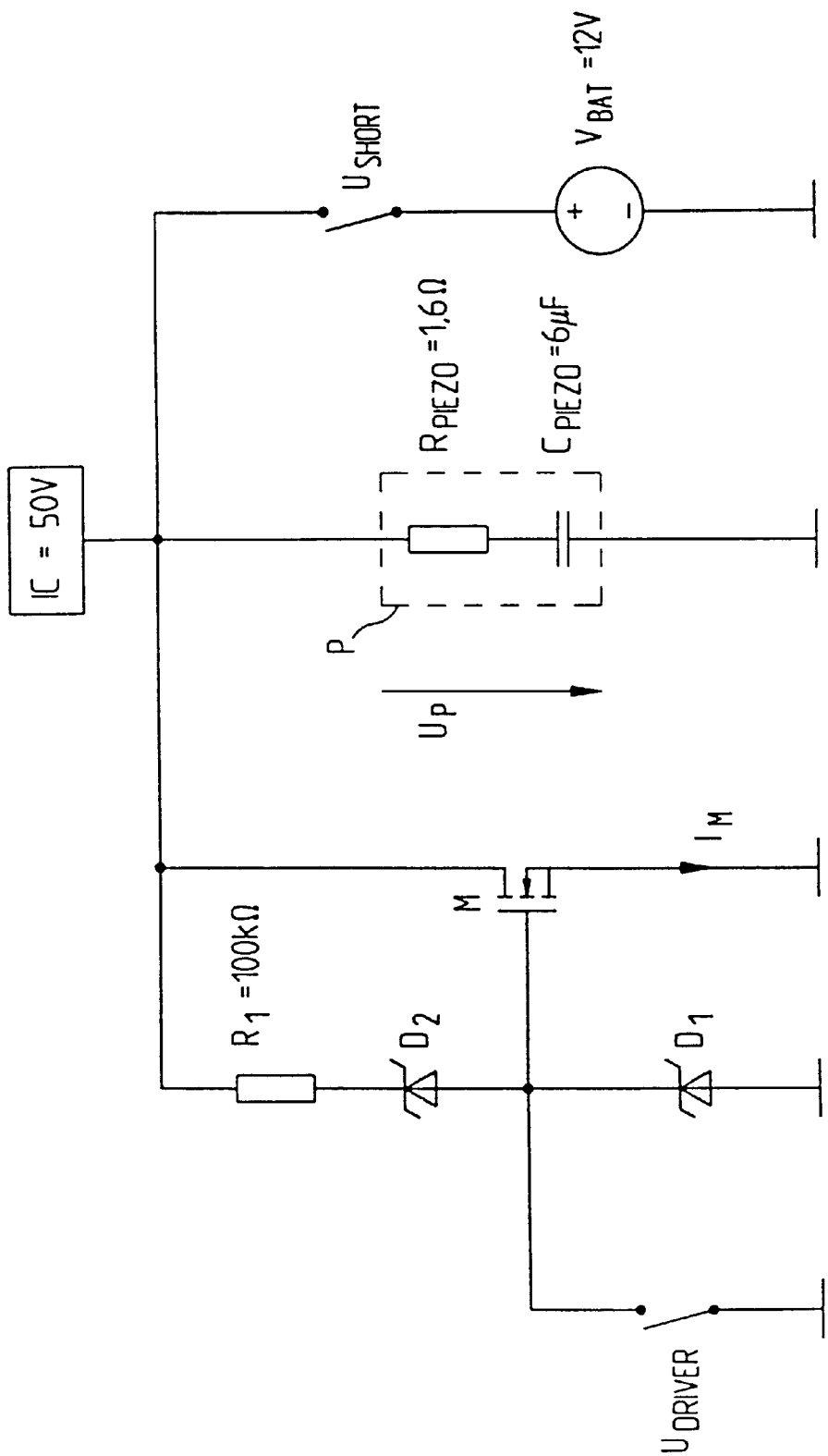
Figure 3B:
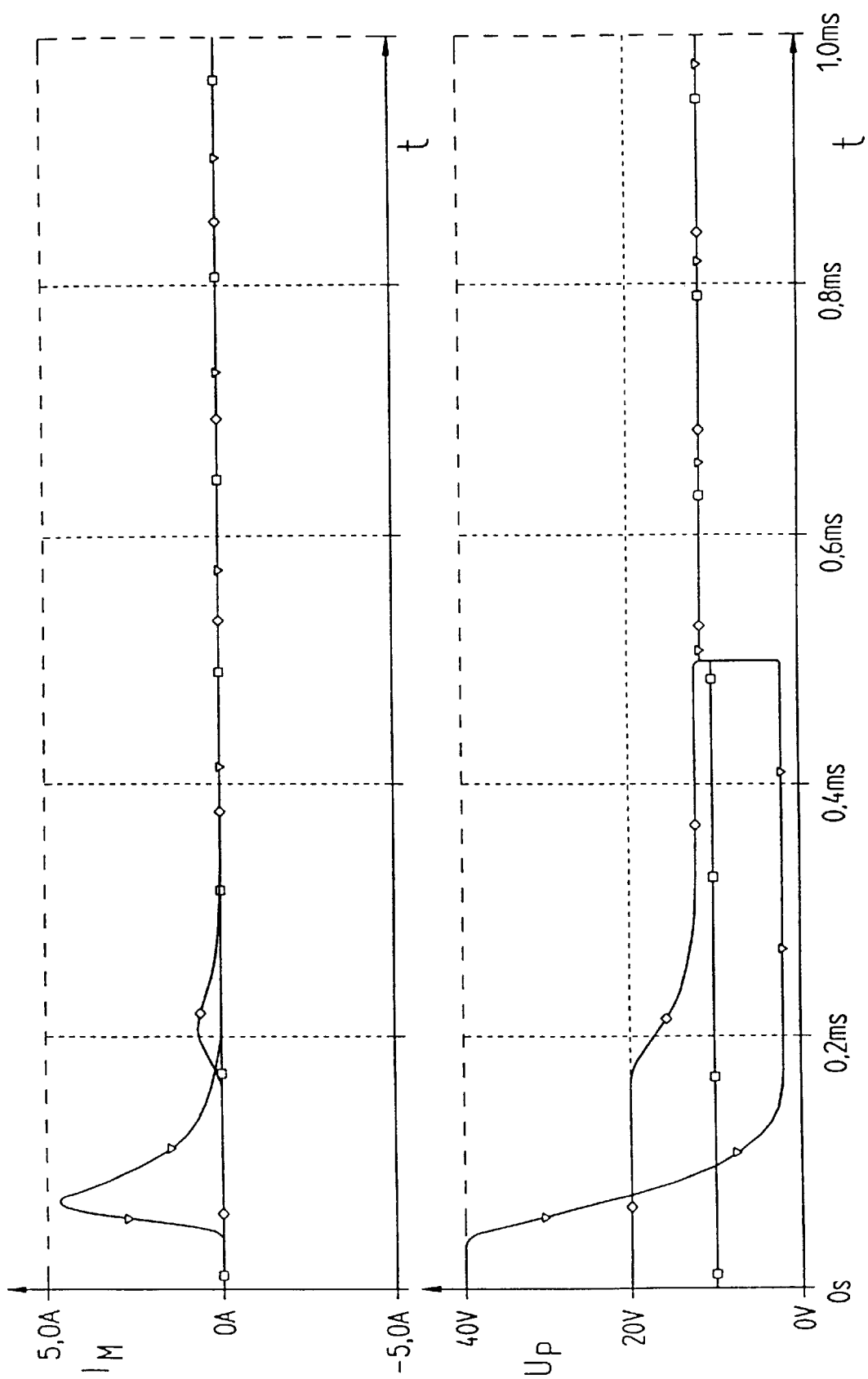

FIG. 1a: as a preferred embodiment of the invention, a discharge switch for a capacitive actuator, FIG. 1b: the curve of the discharge current and actuator voltage in the discharge circuit of FIG. 1a, FIG. 2a: an embodiment of the discharge circuit of FIG. 1a with a voltage divided for connecting the short-circuit switch to the actuator, FIG. 2b: the curve of the discharge current and actuator voltage in the discharge circuit of FIG. 2a, FIG. 3a: another variant of the discharge circuit shown in FIG. 1a with a Zener diode between the controlling input of the discharge switch and the actuator, and FIG. 3b: the curve of the discharge current and actuator voltage in the case of the discharge circuit of FIG. 3a.

The discharge circuit represented in FIG. 1a is a component of a control circuit for an injection valve which is operated by a piezoelectric actuator P.

First the structural aspect of the discharge circuit according to the invention will be described with reference to FIG. 1a, and then the operation of the discharge circuit will be explained.

The piezoelectric actuator P is represented simply as a series circuit of an ohmic resistance $P_{PIEZO}=1.6\ \Omega$ and a condenser $C_{PIEZO}=6\ \mu F$. The one terminal of the actuator P is connected to ground while the other terminal of actuator P is connected to a voltage supply unit IC, represented only schematically, with an output voltage U=50 V, in order to charge the actuator P electrically for an actuation.

Parallel to the actuator P there is connected a discharge switch M which is in the form of a type IRF630 MOSFET and permits an automatic discharge of the actuator P after an actuation. For this purpose the gate input of the discharge switch M is connected through an ohmic resistor R1=100 kΩ to the junction of the actuator P and the voltage supply unit IC, so that the charge voltage of the actuator P acts upon the controlling input of the discharge switch M.

Furthermore, the controlling input of the discharge switch M is connected through a parallel circuit consisting of a first Zener diode D1 and control switch $U_{DRIVER}$, and when the control switch $U_{DRIVER}$ is in the conducting state it is always at ground potential regardless of the charge on the actuator P, so that the discharge switch M in this case is open, thereby preventing any automatic discharge of the actuator P.

Lastly, a series circuit consisting of an additional switch $U_{SHORT}$ and a battery $V_{BAT}$ is connected parallel to the actuator P, the switch $U_{SHORT}$ is not a regular switch, but closes only in case of error, resulting in a short-circuiting of the actuator P to the battery voltage.

The operation of the discharge circuit represented in FIG. 1a will now be explained in detail. In the normal operation of the discharge circuit, the control switch $U_{DRIVER}$ is closed by an external control unit, so that the controlling input of the discharge switch M is grounded and the discharge switch M is kept open, thus preventing any automatic discharge of the actuator P through the discharge switch.

The actuator P can be charged in a conventional manner by the voltage supply unit IC, in order to start a setting action which, in the fuel injection system of an internal combustion engine, serves to inject fuel into the combustion chamber. After the setting action the actuator P is then discharged, in a conventional manner. In the discharged state, then, no fuel is injected into the combustion chamber of the internal combustion engine.

The automatic discharging of the actuator P according to the invention begins only if the above-mentioned controlled discharge fails because, for example, the power supply of the external control unit fails or trouble occurs in the external control unit. In this case the control switch $U_{DRIVER}$ is no longer actuated, so that the controlling input of the discharge switch M is no longer grounded, but assumes the voltage applied through the actuator P and thus is rendered conductive. The actuator P is therefore short-circuited through the discharge switch M, so that the charge stored in the actuator P flows away until the actuator voltage has dropped below the gate voltage threshold of the discharge switch M, whereupon the discharge switch M is opened and the discharging action is ended.

FIG. 1b shows in the upper diagram the time curve of the discharge current $I_M$ through the discharge switch M, and in the lower diagram the corresponding curve of the actuator voltage $U_P$ for three series of measurement, the points where the individual series are measured being identified by squares, triangles and diamonds.

It can easily be seen that the actuator voltage $U_P$ breaks in upon the insertion of the discharge current $I_P$, since the actuator P is discharged through the discharge switch M.

The diagrams also show that the residual discharge voltage of the actuator P is virtually zero, which signifies that the actuator P is almost completely discharged.

At the moment t=0.5 ms a short-circuiting of the actuator P is performed through the battery $V_{BAT}$ since the short-circuiting switch $U_{SHORT}$ is closed, so that the actuator voltage rises to the level of the battery voltage $U_{BAT}$=12 V and the discharge switch M is rendered conductive so that the discharge current $I_M$ rises again.

The discharge circuit represented in FIG. 2a is largely the same as the one represented in FIG. 1a and explained above, so that one can refer substantially to the above description.

The essential difference between the discharge circuit represented in FIG. 2a and the above-described discharge circuit consists in the operation of the controlling input of the discharge switch M which is connected by a voltage divider to the actuator P. For this, an ohmic resistor R2=50 kΩ is connected parallel to the first Zener diode D1 and with the resistor R1=100 kΩ forms the voltage divider, so that only one-third of the actuator voltage $U_P$ is applied to the controlling input of the discharge switch. This division of the actuator voltage $U_P$ prevents the discharge switch M from being made conductive in case of a short circuit of the actuator P by the short-circuit switch $U_{SHORT}$ and the battery $V_{BAT}$ by the battery voltage. This is important, since the battery $V_{BAT}$ would otherwise drive a heavy current $I_M$ through the conducting discharge switch M, which might destroy the discharge switch M. The voltage divider consisting of the resistors R1 and R2 is thus of such a size that the residual discharge voltage of the actuator P is above the battery voltage.

FIG. 2b shows in the upper diagram the time curve of the discharge current in the case of the discharge circuit represented in FIG. 2a, while the lower diagram shows the corresponding curve of the actuator voltage. The diagrams represent three series of measurements wherein the points of measurement are identified by triangles, squares or diamonds corresponding to the particular series of measurements.

It is again easy to see that the actuator voltage breaks in when the discharge current begins, since the actuator P is then short-circuited through the discharge switch M. In contrast to the diagram shown in FIG. 1b, however, the discharge current does not rise again if the actuator P is short-circuited at the moment t=0.5 ms through the short-circuiting switch $U_{SHORT}$ and the battery $V_{BAT}$. This is because the controlling input of the discharge switch M is connected to a voltage divider, so that it is not the full battery voltage $V_{BAT}$ that is applied to the controlling input of the discharge switch M. The voltage divider composed of the resistors R1 and R2 is designed such that the battery voltage is not enough to reach the gate voltage threshold of the discharge switch M, so that the discharge switch M continues to interrupt even when the short-circuit switch $U_{SHORT}$ closes.

The discharge circuit according to the invention represented in FIG. 3a is likewise largely the same as the discharge circuit of FIG. 1a, so that basically the explanation thereof can be consulted.

The only difference between this discharge circuit and the one represented in FIG. 1a again consists in the operation of the controlling input of the discharge switch M which is connected by a series circuit of a resistance R1=100 kΩ and a second Zener diode D2 to the actuator P. The control voltage applied to the controlling input of the discharge switch M is therefore lower by the Zener diode voltage $U_Z$ than the actuator voltage $U_P$. This signifies that the discharge switch M does not turn conductive until the actuator voltage $U_P$ exceeds the sum of the Zener diode voltage $U_Z$ plus the gate voltage threshold of the discharge switch M, so that the residual discharge voltage of the actuator P can be adjusted accordingly by selecting the second Zener diode D2. The second Zener diode D2 is in this case of such a rating that the battery voltage $V_{BAT}$ is not great enough to make the discharge switch M conductive. This is important, since in the event of a short circuit the battery $V_{BAT}$ would otherwise drive a large current $I_M$ through the discharge switch M and destroy it.

FIG. 3b shows in the upper diagram the time curve of the discharge current $I_M$ in the discharge circuit represented in FIG. 3a, while the lower diagram shows the corresponding curve of the actuator voltage $U_P$. The diagrams represent three measurement series each, the points of measurement being identified in each by triangles, squares or diamonds.

Here too it can clearly be seen that the actuator voltage $U_P$ breaks in when the discharge current $I_M$ begins. The discharge current $I_M$, however, does not rise up again when the actuator P is short circuited at the time t=0.5 ms through the short-circuit switch $U_{SHORT}$, although then the battery voltage $U_{BAT}$=12 V is applied to the actuator P. This is because the controlling input of the discharge switch M is connected by the second Zener diode D2 to the actuator P, so that the control voltage is reduced by the Zener diode voltage below the battery voltage and the actuator voltage. The discharge switch M, therefore, in the event of a short-circuiting of the actuator P through the short-circuit switch $U_{SHORT}$ and the battery $V_{BAT}$, would become conductive only when the battery voltage is greater than the sum of the Zener diode voltage plus the gate voltage threshold, which, however, is not the case, so as to prevent in this case the destruction of the discharge switch M by extremely great discharge currents $I_M$.

The invention is not limited in its embodiment to the preferred embodiments given above. Instead, a number of variants is conceivable, which make use of the solution represented, even in the case of fundamentally different kinds of embodiments.

What is claimed is:

1. Discharge circuit for a capacitive actuator (P), especially for a piezoelectrically operated injection valve for an internal combustion engine, said actuator (P) having a first terminal and a second terminal, said first terminal being connected to ground and said second terminal being connected to a voltage supply (IC) for charging the actuator (P) electrically for an actuation, comprising:

a controlled discharge switch (M) having a first terminal and a second terminal, said first terminal of said discharge switch (M) being connected to said first terminal of said actuator (P), said second terminal of said discharge switch (M) being connected to said second terminal of said actuator (P), said discharge switch (M) having a controlling input being connected to a control unit which holds the discharge switch (M) open in normal operation regardless of the charge of the actuator (P) and thus prevents a discharge, said controlling input being additionally connected to the second terminal of said actuator (P) so that, in case of a failure of the control unit and a charged actuator (P), the discharge switch (M) is rendered conductive by the electric voltage of the actuator (P) and the actuator (P) is thereby discharged.

2. Discharge circuit according to claim 1, characterized in that the controlling input of the discharge switch (M) is connected through a resistor (R1) to the actuator (P).

3. Discharge circuit according to claim 1, characterized in that a controlled short-circuit switch ($U_{SHORT}$) is disposed in the circuit of the actuator in order to be able to short-circuit the actuator (P) and thereby discharge it.

4. Discharge circuit according to claim 3, characterized in that the controlling input of the discharge switch (M) is connected by a voltage divider (R1, R2) to the actuator (P), the voltage divider (R1, R2) being of such a size that, in case of a short circuit of the short-circuit switch ($U_{SHORT}$), the battery voltage ($V_{BAT}$) will not suffice to render the discharge switch (M) conductive.

5. Discharge circuit according to claim 1, characterized in that the controlling input of the discharge switch (M) is connected through a Zener diode (D2) and a resistor (R1) to the actuator, the Zener diode (D2) being of such size that the battery voltage ($V_{BAT}$) applied to the actuator (P) in the event of a short-circuiting of the short-circuit switch will not suffice to render the discharge switch (M) conductive.

6. Discharge switch according to claim 1, characterized in that the discharge switch is a MOSFET.

* * * * *